May 13, 1958 G. C. FIELDS 2,834,379
FLUID FLOW CONTROL UNIT
Filed Aug. 21, 1956

INVENTOR
George C. Fields
BY
H. F. Johnston
ATTORNEY

United States Patent Office 2,834,379
Patented May 13, 1958

2,834,379

FLUID FLOW CONTROL UNIT

George C. Fields, Wilmette, Ill., assignor to Scovill Manufacturing Company, Waterbury, Conn., a specially chartered corporation of Connecticut Application August 21, 1956, Serial No. 605,343

3 Claims. (Cl. 138—43)

This invention relates to a fluid flow control unit for controlling the flow of fluid to a device from a feed pipe wherein the pressures may vary considerably.

Heretofore devices have been provided to control the flow of fluid of varying pressures through the use of annular rubber washers placed in a pipe line where pressure on the washer would bend the washer to restrict its center opening. These devices are not entirely satisfactory because up to a certain pressure the washer opening would be restricted to a minimum diameter and beyond that pressure the opening would increase in size.

Also cylindrical rubber discs have been used in flow control devices which have been objectionable because of a lack of a free flow of fluid through the center of the control disc. In other words, the fluid would flow about the edge of the disc and set up turbulences in the delivery line that would be objectionable.

It is an object of my invention to overcome the above and other defects in flow control devices by providing an annular resilient washer and a pressure responsive element with flow channels therein, which element is adapted to be pressed against the washer while in a flat state and cause said washer to progressively fill into the channels in proportion to the pressures applied against said element and thereby control the flow of fluid passing through said device.

Another object of my invention is to provide a flow control device which is simple in construction, efficient in operation and economical in cost.

Other objects of my invention will become evident from the following detailed description taken in conjunction with the accompanying drawing, in which.

Figure 1:
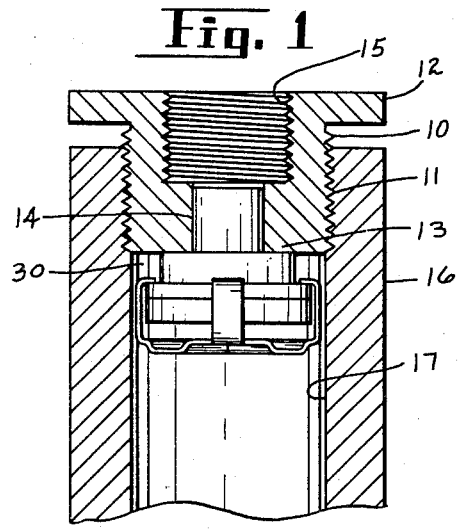
Fig. 1 is a vertical sectional view of a flow control device or unit as it appears assembled into a flow line and embodying my invention.
Figure 2:
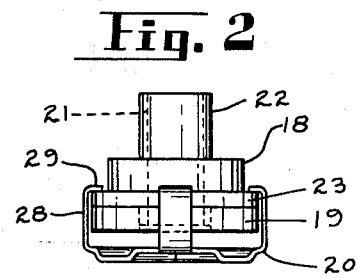
Fig. 2 is a side view of the unit, per se, showing the fluid responsive member inactive.

Referring now to the drawing, there is disclosed a bushing 10 having a threaded section 11 and a hexagonal section 12 at one end and a partially closed end portion 13 at its opposite end with a central orifice 14 therein. The bushing 10 has a tapped recess 15 into which the device to be supplied with a controlled fluid may be attached. The bushing 10 is adapted to be threaded into the end of a feed pipe 16 which may be a part of a base for use in a lawn sprinkler. The pipe 16 when attached to the bushing 10 defines a chamber 17 into which my flow control unit may be placed.

The flow control unit consists of a body 18, a rubber washer 19 and a fluid responsive member in the form of a spider 20. The body 18 is provided with an axial port or passageway 21 and an integral neck 22 adapted to have a drive fit in the bushing orifice 14 to hold the control unit in place in the chamber 17.

A flange 23 extends outwardly from the body 10 to a diameter substantially the same as the washer 19 and provides a flat base or annular shoulder 24 against which the washer 19 is seated. The washer 19 is held in place against the shoulder 24 by a shorter neck 25 extending from the opposite end of the body 18 and adapted to have a forced fit into the opening in said washer.

The fluid responsive element or spider 20 preferably is made of sheet metal and consists of a disc base portion 26 having crossed grooves embossed therein to provide channels 27 in its upper surface intercepting the edge of said disc base. A series of fingers 28 extend upwardly from the edge of the disc base and are connected thereto midway between the end of the passages 27. The fingers 28 terminate in inward lugs 29 that are disposed in an annular channel 30 defined by the flange 23 and the bushing end portion 13 and are free to move up and down therein. The fingers 28 and lugs 29 serve to loosely hold the spider 20 assembled to the body 18, and the lugs 29 normally rest upon the flange 23 and position the disc base portion 26 in spaced relation below the washer 19.

Figure 3:
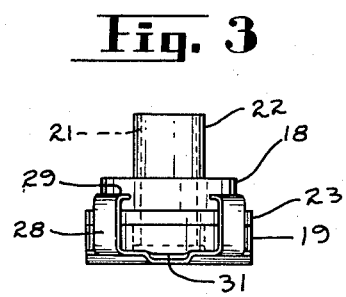
Fig. 3 is a view similar to Fig. 2 but turned 45° and showing the fluid responsive member compressed against the washer.
Figure 5:
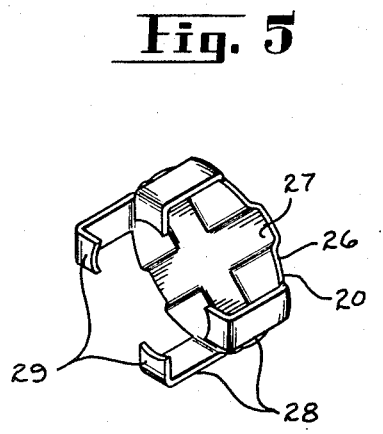
Fig. 5 is a perspective view of the fluid responsive element, per se.
Figure 4:
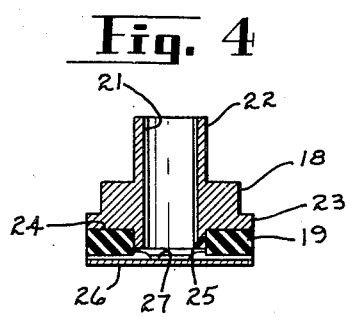
Fig. 4 is a vertical sectional view through the unit in the Fig. 3 state.

In the operation of my flow control unit, when fluid is passing upwardly through the inlet pipe 16 against the disc base 26 of the spider 20, it will force the latter upwardly to a position where the base abuts the resilient washer after which the fluid will be caused to pass inwardly through the channels 27 and thence upwardly through the port 21. When the fluid pressure is such that the disc base is abutted against the resilient washer without making any impression on or deforming said washer, the maximum flow of fluid through the unit will be obtained. As the fluid pressure increases the disc base will be forced more tightly against the washer 19 causing the latter to be proportionately compressed into the channels 27 as indicated at 31 in Fig. 3 and restricting the cross sectional area thereof and provide a restriction to the flow of fluid therethrough.

It will be understood that modifications and variations may be effected without departing from the scope of the novel conceptions of the present invention.

I claim:

1. A flow control device for use in a fluid supply line of varying pressures, said device comprising a member having a central passageway therethrough, an annular shoulder surrounding the passageway, a resilient annular washer of rubber-like material firmly seated against said annular shoulder and fixed to the end face of said member, a spider member having a base portion and a series of fingers loosely embracing said washer and shoulder to allow a floating action to said spider member and channels formed in said base portion adjacent said washer whereby said spider member is pressed against said washer by the fluid pressures and the channels are proportionately closed off in forcing the washer material into said channels for controlling the fluid passing therethrough.

2. A flow control unit for assembly into a fluid supply line of varying pressures, said unit comprising a body, a resilient washer and a pressure responsive element, said body having a passageway therethrough and a flat shoulder surrounding one end of said passageway, means supporting said washer against said shoulder, said element having a base portion disposed across said body passageway and a series of fingers loosely embracing said body, said base portion having channels formed radially therein on the side adjacent said washer whereupon when fluid pressure is applied against said base portion said washer will be compressed and proportionately fill and restrict said channels.

3. A flow control unit for assembly into a fluid supply line of varying pressures, said unit comprising a body, a resilient washer and a pressure responsive element, said body having a passageway therethrough and a flat shoulder surrounding one end of said passageway, means supporting said washer against said shoulder, said pressure responsive element being in the form of a sheet metal spider having a base portion disposed across said body passageway, said base portion having embossed cross grooves formed therein intercepting the edge thereof and providing channels adjacent said washer, a series of fingers connected to the edge of said base portion between the exit ends of said channels, and means loosely connecting said fingers to said body to allow floating movement of said spider whereupon when fluid pressure is applied against said base portion the latter will be compressed against said washer and said washer material will be deformed into and restrict said channels proportionate to the fluid pressures.

References Cited in the file of this patent

UNITED STATES PATENTS 2,289,905     Dasher _____ July 14, 1942